Feb. 1, 1966  P. DE FLOREZ ETAL  3,232,243
CANDY MAKING APPARATUS
Filed Aug. 9, 1962  10 Sheets-Sheet 1

INVENTORS
PETER de FLOREZ
EDWIN K. SMITH JR
NELSON TREMAINE
DOMINICK V. MAMMOLITO
BY
Bauer and Seymour
ATTORNEYS INVENTORS
PETER deFLOREZ
EDWIN K. SMITH JR
NELSON TREMAINE
DOMINICK V. MAMMOLITO
Bauer and Seymour
ATTORNEYS

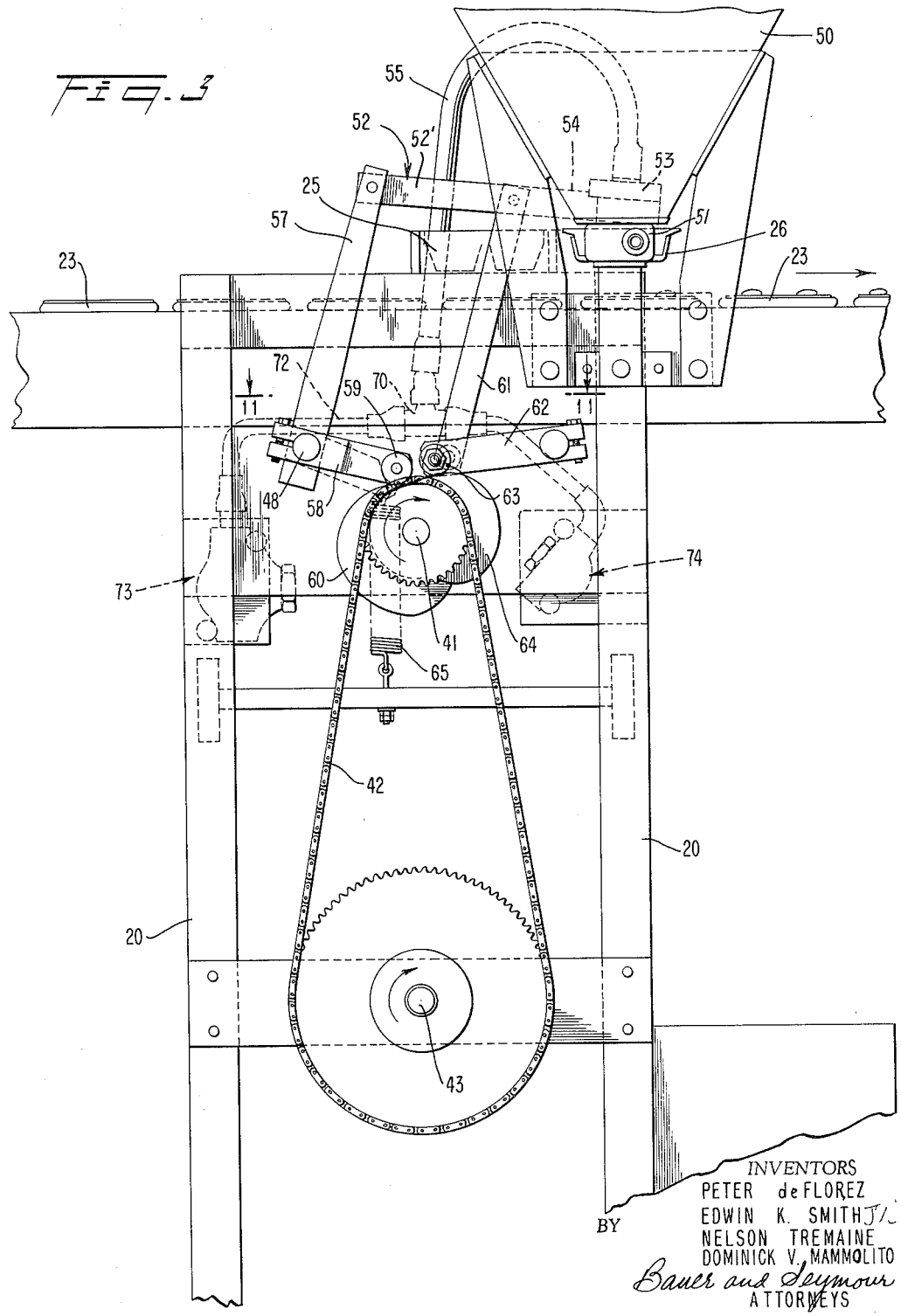

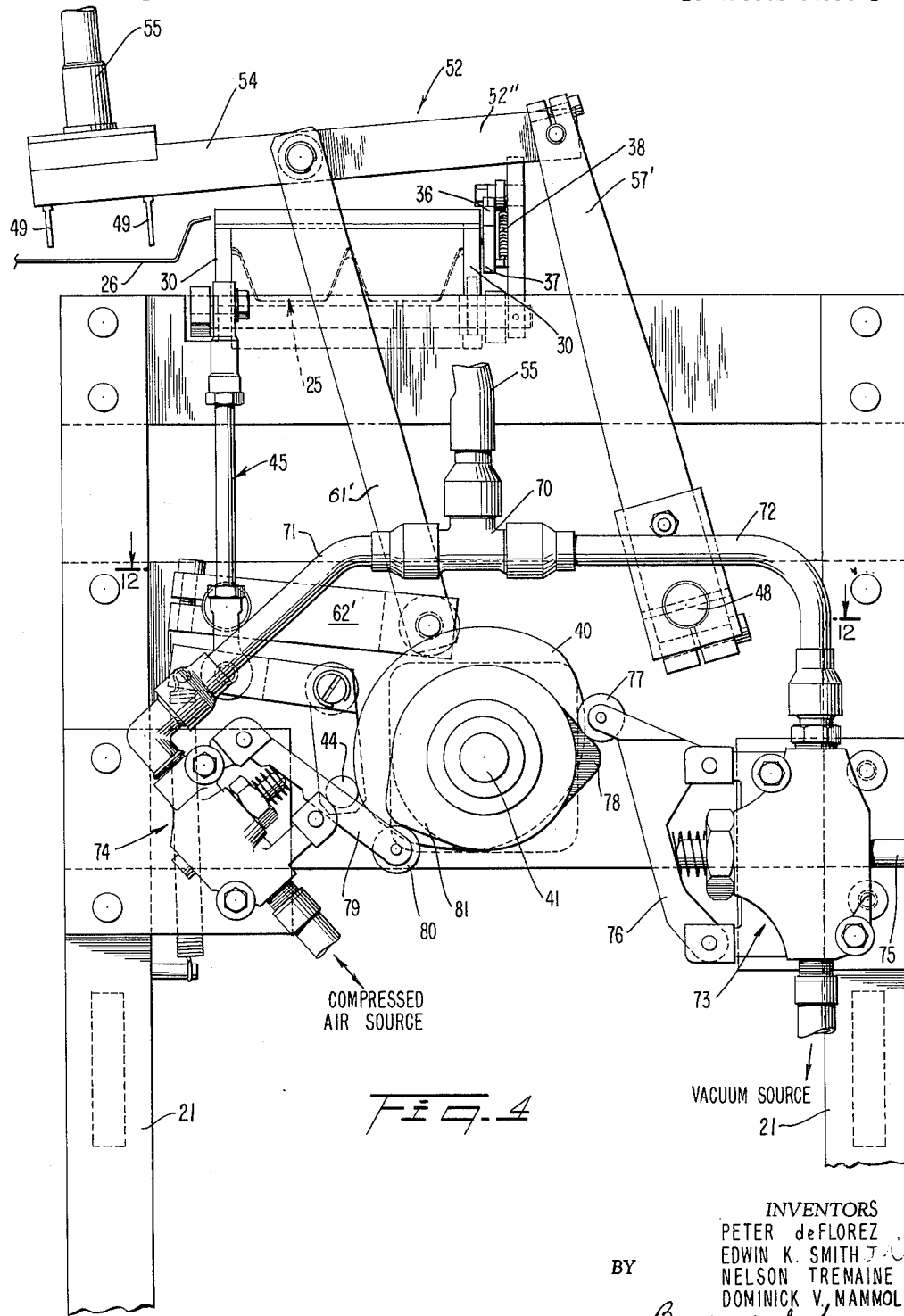

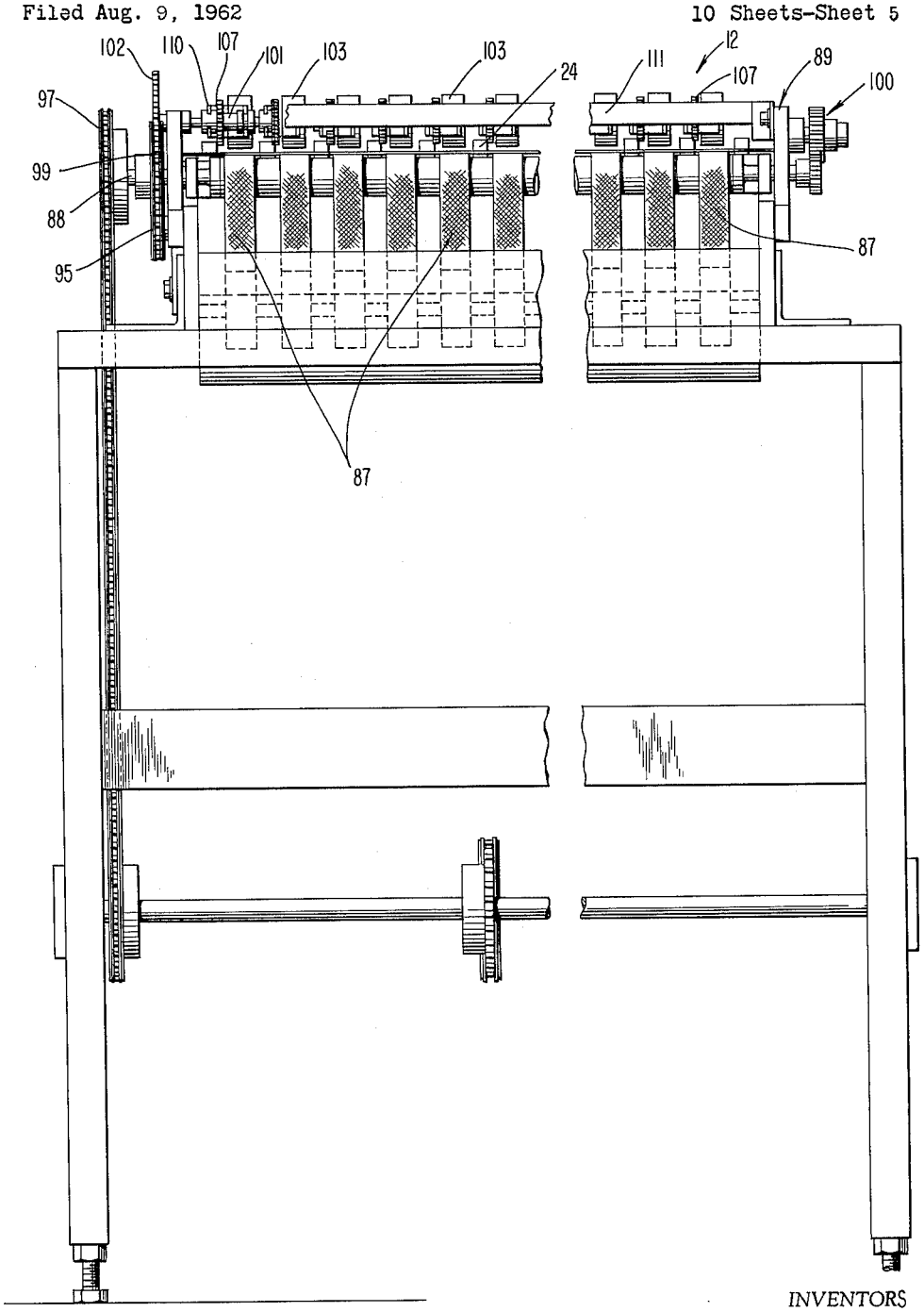

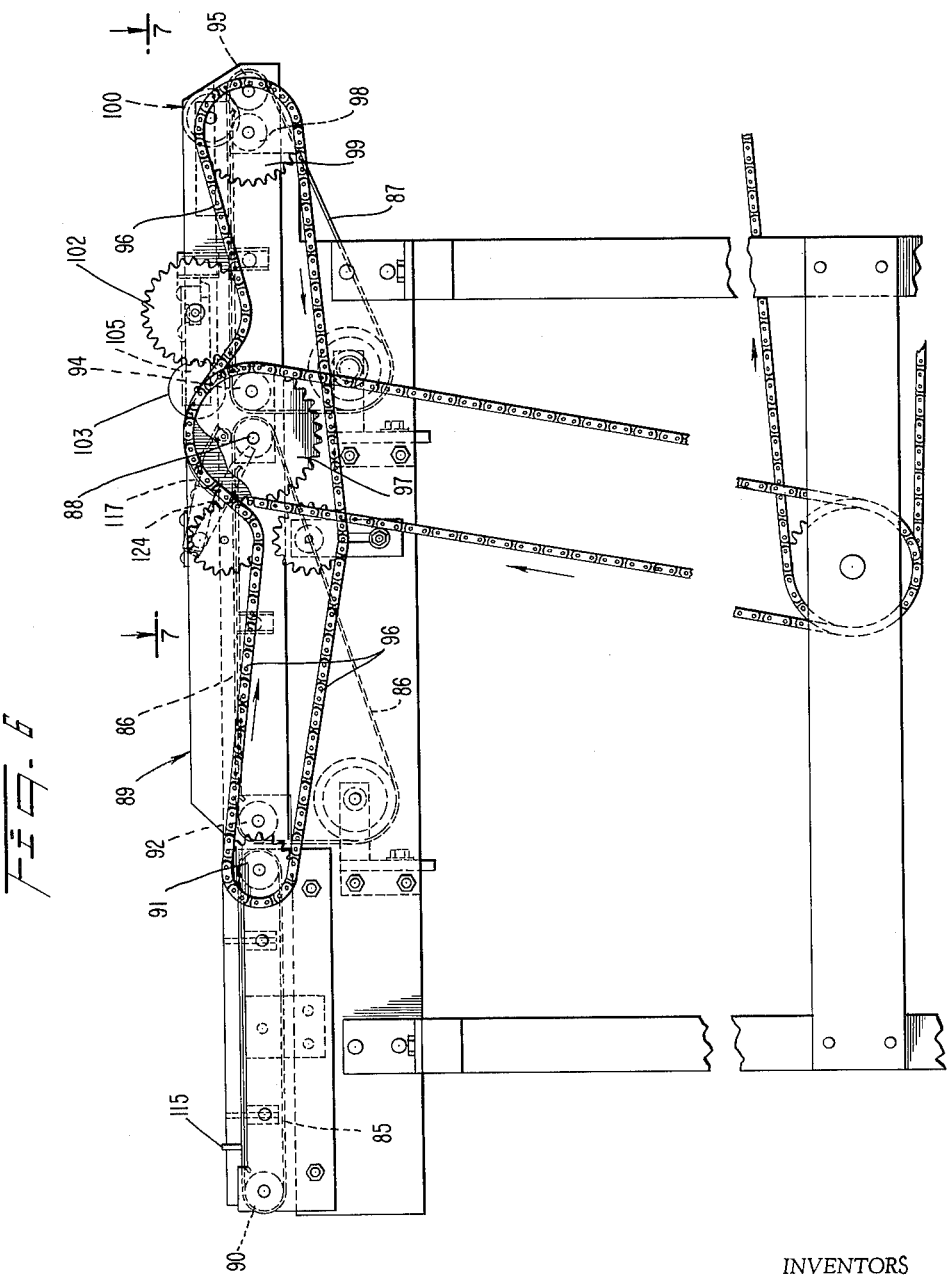

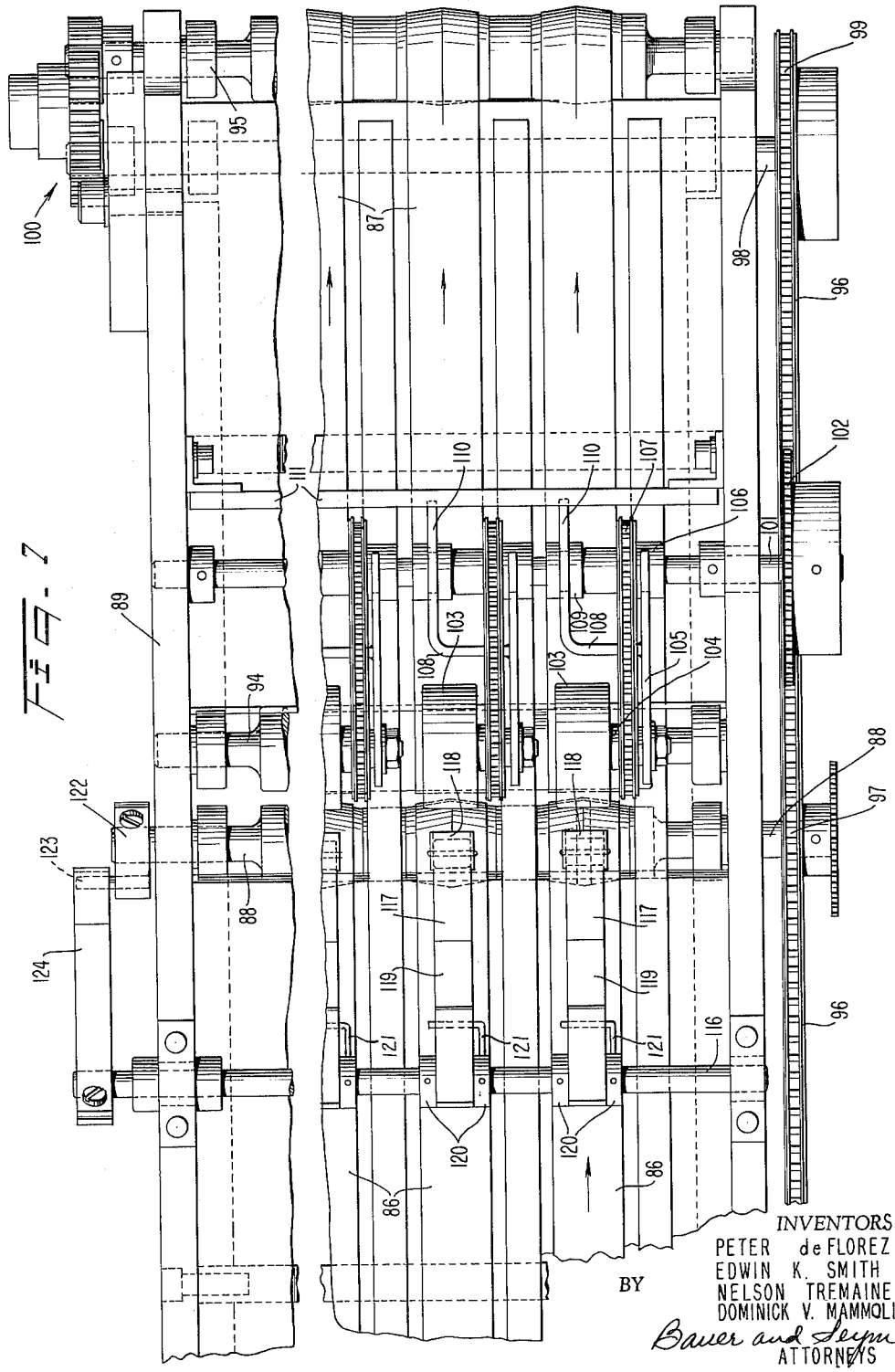

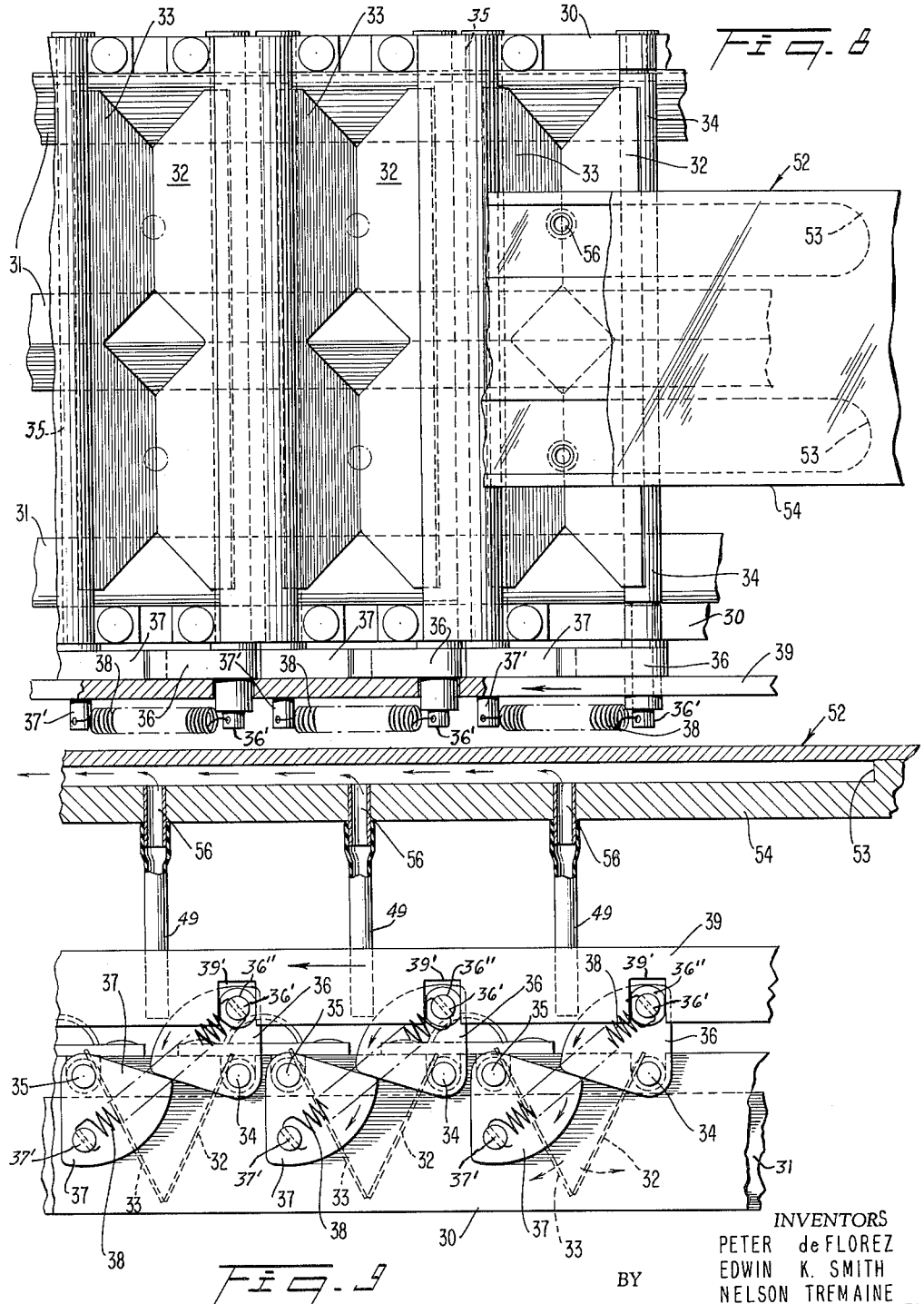

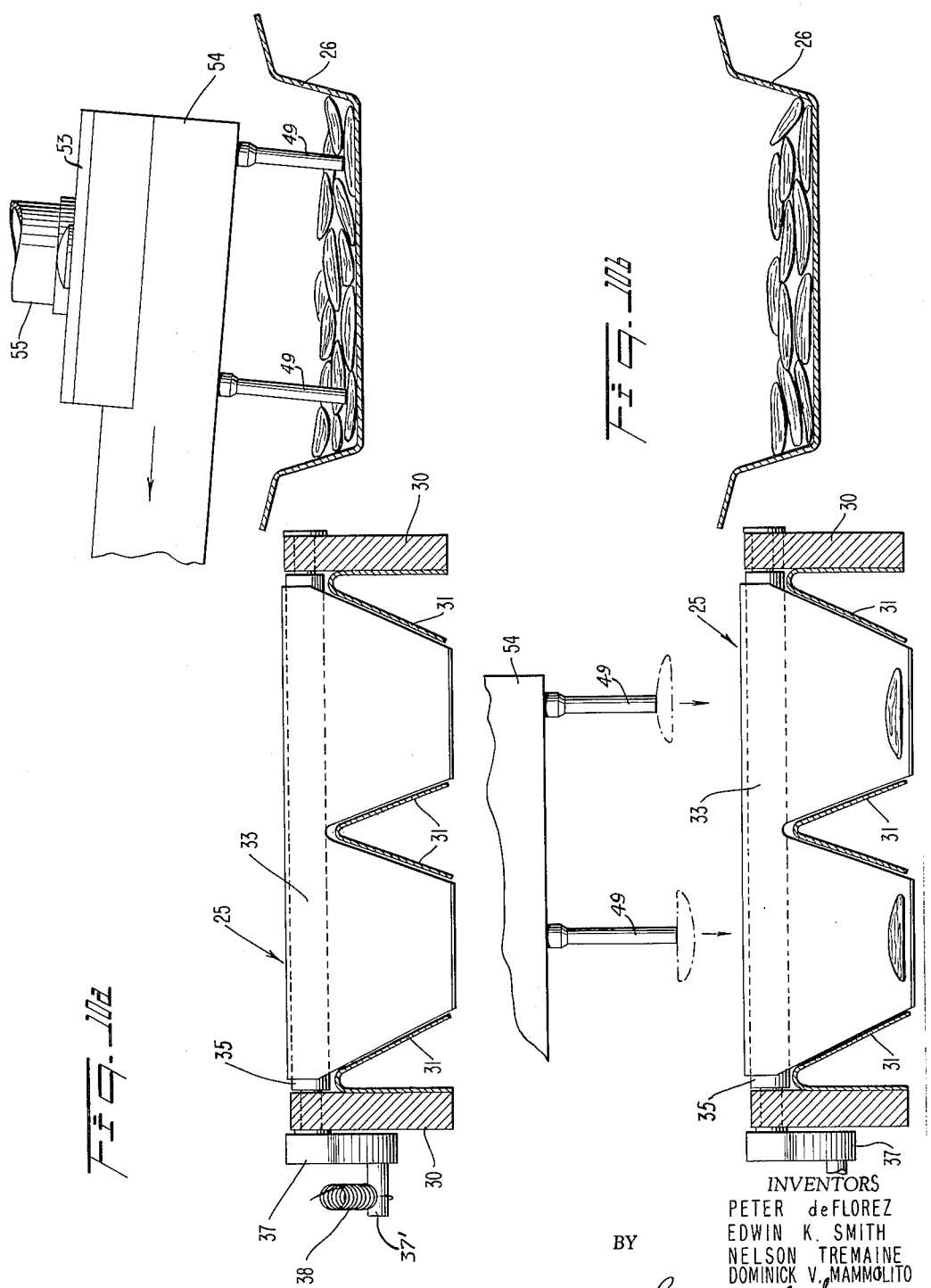

United States Patent Office 3,232,243
Patented Feb. 1, 1966

3,232,243
CANDY MAKING APPARATUS
Peter de Florez, Palisades, Edwin K. Smith, Jr., Haworth, and Nelson Tremaine, Glen Rock, N.J., and Dominick V. Mammolito, Staten Island, N.Y., assignors to MGD Research & Development Corporation, a corporation of Delaware
Filed Aug. 9, 1962, Ser. No. 215,884
7 Claims. (Cl. 107—1)

This invention relates to a candy making apparatus and more particularly to an apparatus for laying nuts on the top of previously formed candy bars.

Many chocolate coated candy bars have nuts attached to their top surfaces. The usual manner of producing these candy bars is to deposit the nuts on the top surface of the previously formed candy bar or center and to then coat the center and nuts with chocolate in an enrobing apparatus. Applicants' invention relates to an apparatus to deposit two nuts equally spaced on each center. While other machines have attempted to perform this function they have been so unsuccessful that the process is now performed by hand. The hand operation is costly and greatly reduces the rate of production.

It is an object of this invention to provide an apparatus for selectively depositing nuts on each candy bar center and in which a plurality of centers are continuously moving past the depositing station at a high rate of speed.

Another object is to provide an apparatus in which nuts are quickly and efficiently transferred from a supply thereof to a nut laying apparatus with a minimum of misfeeds.

Another object is to simultaneously lay nuts on a plurality of rows of continuously moving candy bar centers with increased speed and increased accuracy in proper feeding of the predetermined number of nuts for each center.

Another object is to provide a nut laying apparatus having a means for feeding and spacing the candy bar centers on a conveyor means in timed relation to said nut laying apparatus.

Another object is to provide a novel means of transferring nuts from a supply thereof to a nut laying means.

Another object is to provide a novel means of holding the deposited nuts on each candy bar center.

Another object is to provide a novel means to pick-up the proper number of nuts from a supply thereof.

A still further object is to provide a novel nut laying machine in which the nuts are properly oriented in relation to the movement of the candy bar centers and wherein the properly oriented nuts are quickly and efficiently deposited on each center without disturbing the orientation thereof.

The above and further objects and novel features will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a side view of the apparatus;

FIG. 3 is an enlarged side view of the nut laying apparatus taken from the same side as the view shown in FIG. 1 and showing the drive means for the nut transferring apparatus;

FIG. 4 is an enlarged side view of the nut laying apparatus taken from the opposite side of the view shown in FIG. 1 and showing the means for controlling the vacuum supply to the nut transferring apparatus, and the means for actuating the bucket means;

FIG. 5 is an end elevation view of the escapement apparatus and taken along line 5—5 of FIG. 1;

FIG. 6 is an enlarged side view, partly in section, and taken from the same side as shown in FIG. 1, showing the escapement apparatus;

FIG. 7 is a top plan view of the escapement apparatus taken along line 7—7 of FIG. 6;

FIG. 8 is an enlarged fragmentary top plan view of the bucket of the nut laying apparatus taken along line 8—8 of FIG. 2;

FIG. 9 is an enlarged fragmentary view, partly in section of the buckets as shown in FIG. 2;

FIG. 10a is a cross-sectional side elevation view of a bucket, the nut feed tray and the nut transferring apparatus and taken along line 10—10 of FIG. 2;

FIG. 10b is a view like FIG. 10a showing the nut transfer apparatus in position over the bucket;

This invention comprises a nut laying apparatus 10, a take-away means 11, and a feed means comprising an escapement apparatus 12 and a striping apparatus 13.

Figure 1:
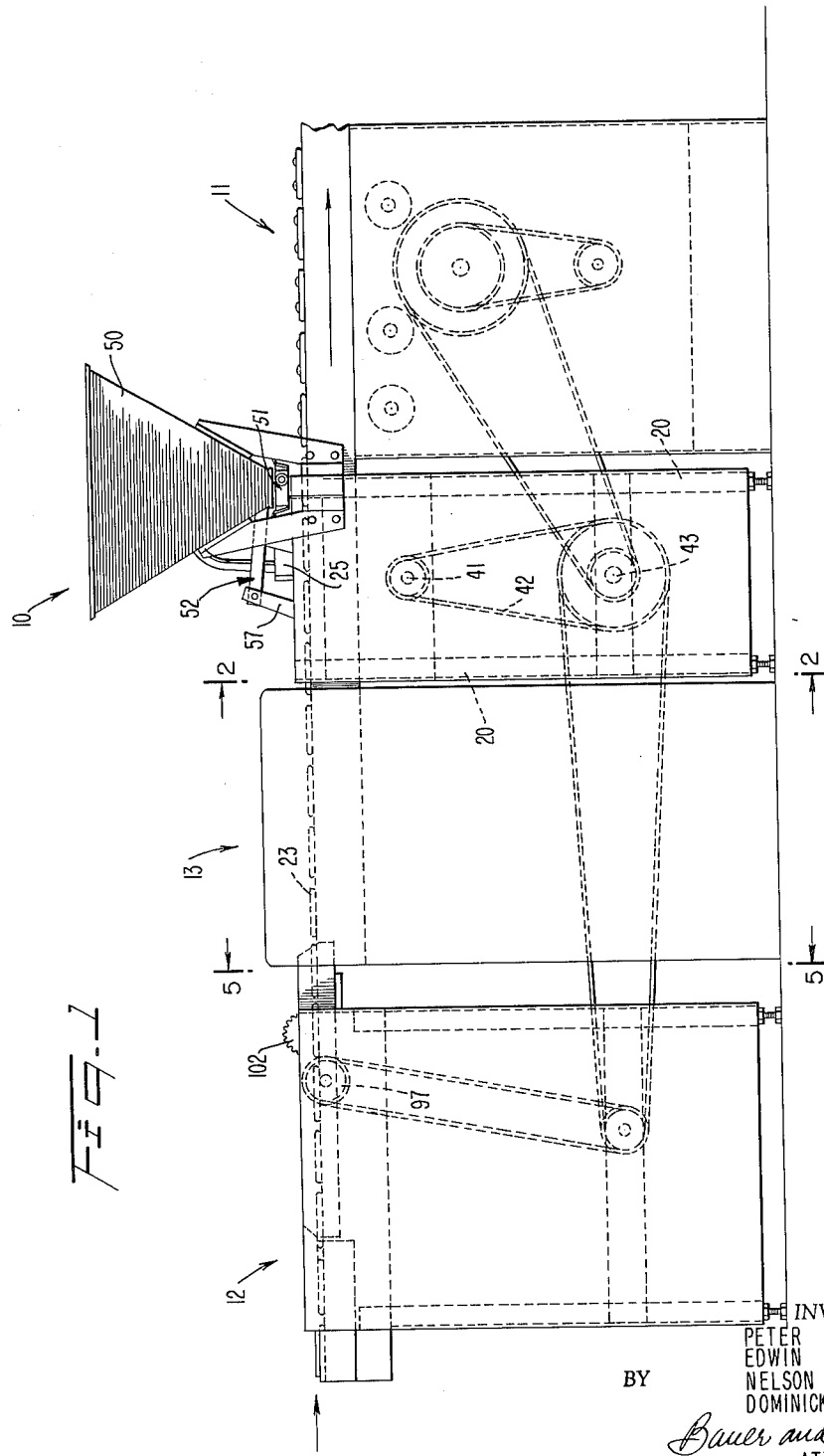
Figure 2:
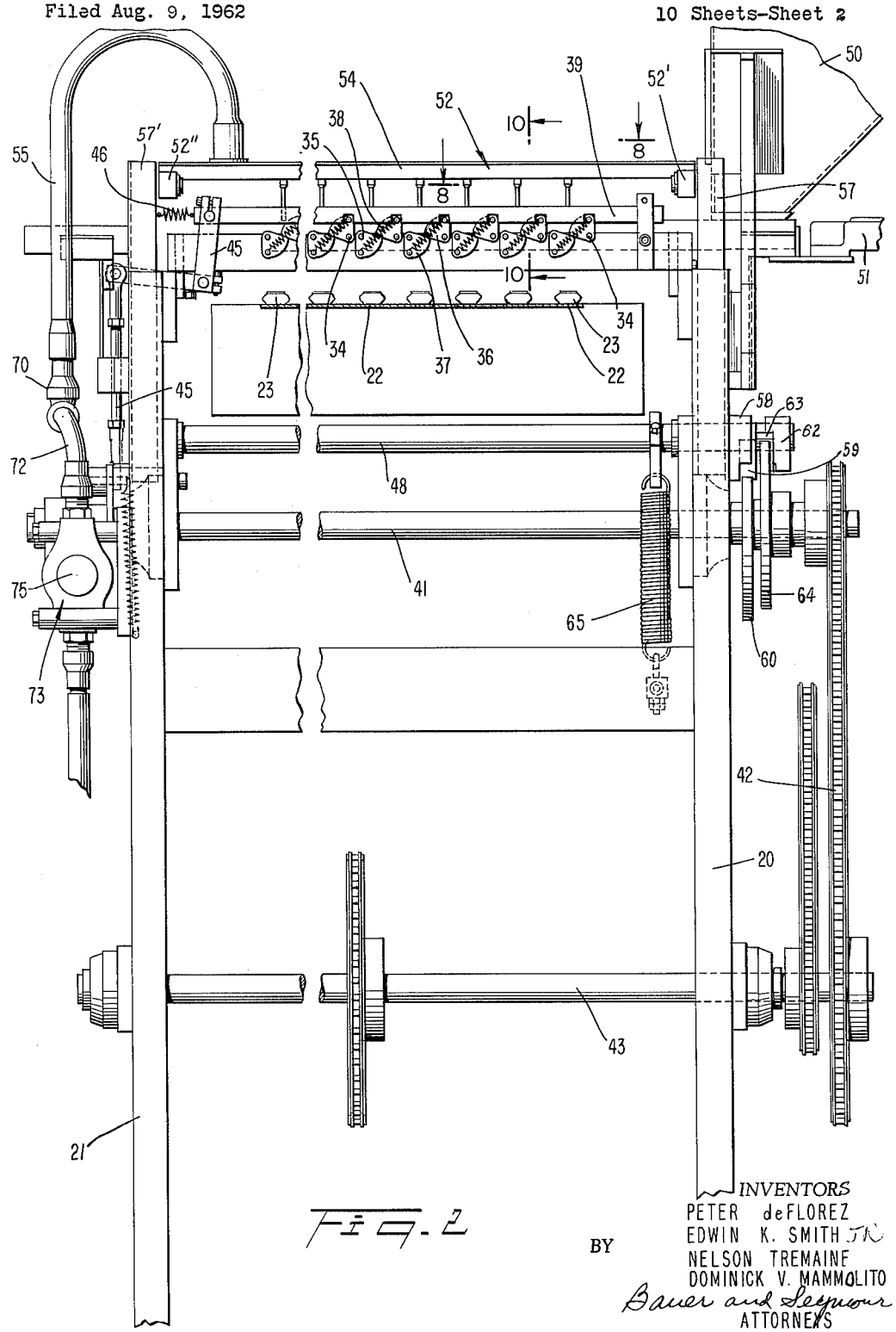
FIG. 2 is an end elevational view of the nut laying apparatus taken along line 2—2 of FIG. 1.

The nut laying apparatus, as shown in FIGS. 2 and 3 comprises two pairs of spaced apart upright support members 20, 21. An endless conveyor belt 22 extends horizontally through the apparatus for conveying a plurality of rows of successively fed candy bar centers 23. A plurality of buckets 25 are mounted over the conveyor belt 22 with each bucket positioned in alignment with one line of centers on the conveyor belt. Extending transversely of the nut laying apparatus, and forwardly of buckets 25 is a nut feed tray 26 into which a supply of nuts are fed as will be hereinafter described.

A pair of transverse beams 30 support the buckets 25 as shown in FIGS. 8, 9 and 10a. As shown, each bucket is divided into two compartments by fixed walls 31 which extend inwardly toward each other as shown more clearly in FIG. 10a. It is to be understood, however, that more than two divisions can be provided. Walls 31 continuously extend transversely of the apparatus and form the end walls for all of the buckets. Each bucket has a pair of side walls 32, 33. Side wall 32 has a rod 34 secured to its upper edge and the ends of rod 34 are rotatably secured in beams 30. Side wall 33 has a rod 35 secured to its upper edge and the ends of rod 35 are rotatably secured in beams 30. A common end of each of the rods 34, 35 extends beyond one beam 30. Rod 34 has a cam 36 secured to its outer end and rod 35 has a cam 37 secured to its outer end and positioned in vertical alignment with cam 36. A spring 38 is secured between studs 36' and 37' on cams 36, 37 respectively to keep them in constant engagement as shown in FIG. 9. A slide 39 is mounted for horizontal reciprocation above beam 30 and notches 39' in the slide engage flatted sleeves 36" which are carried on the studs 36' for relative rotation thereon. Thus as slide 39 is moved to the left, as viewed in FIG. 9, each of the cams 36 is rotated in a counterclockwise direction. Since each cam 36 engages its associated cam 37 the movement of one results in the movement of the other. It will be observed that cam 36 moves clockwise around shaft 34 and cam 37 moves counterclockwise around shaft 35. Consequently upon movement of cams 36, 37 each of the side walls 32, 33 move outwardly away from each other and nuts held in the buckets are released to fall downwardly. From FIGS. 8 and 9 it will be seen that because of the shape of the side and end walls of each of the buckets each nut deposited therein will automatically be oriented so that its longer axis is in alignment with the longitudinal axis of a candy bar center passing below on the conveyor belt 22. The movement of slide 39 is controlled by a cam 40 secured to transversely extending shaft 41. Shaft 41 has each end mounted in suitable bearings in supports carried by members 20, 21 and is operatively connected through a chain drive 42, to the main drive shaft 43. A cam follower 44 is operatively associated with cam 40 and is secured to one end of a plurality of linkages 45. The other end of linkages 45 is secured to slide 39. A spring 46 urges the slide 39 to the left, as shown in FIG. 2, and at the same time forces the cam follower 44 into constant contact with cam 40. By the predesigned shape of cam 40 the movement of slide 39 and hence the opening of the buckets can be controlled so that the previously deposited nuts are quickly released and deposited on a candy bar passing below the buckets. Vibratory means are provided to impart vibrations to the bucket structures to assure that each nut is positioned at the bucket prior to the opening of the same.

The nut feed supply comprises a feed tray 26 which extends transversely of the apparatus and the conveyor belt 22. A hopper 50, having an opening in its bottom, is mounted over one end of the tray 26. The bottom edge of the hopper is spaced out of contact with any portion of tray 26. A series of sharp vibratory impulses is imparted to tray 26 in order to feed nuts across the length of said tray. For reasons which will shortly become apparent, it is important that the nuts in tray 26 be evenly distributed throughout the entire length thereof and that the distribution be constantly carried on to assure a continuation of the even distribution. To accomplish this purpose an air operated vibrator 51 is secured directly to one end of tray 26. While the vibrator 51 shown is of the air operated type, other commercially available types of vibrators could be used. Hopper 50 is filled with nuts and the vibrations from the nuts in tray 26 will be transmitted through the nuts themselves to the nuts in the hopper to assure constant feeding to the tray.

Figure 11:
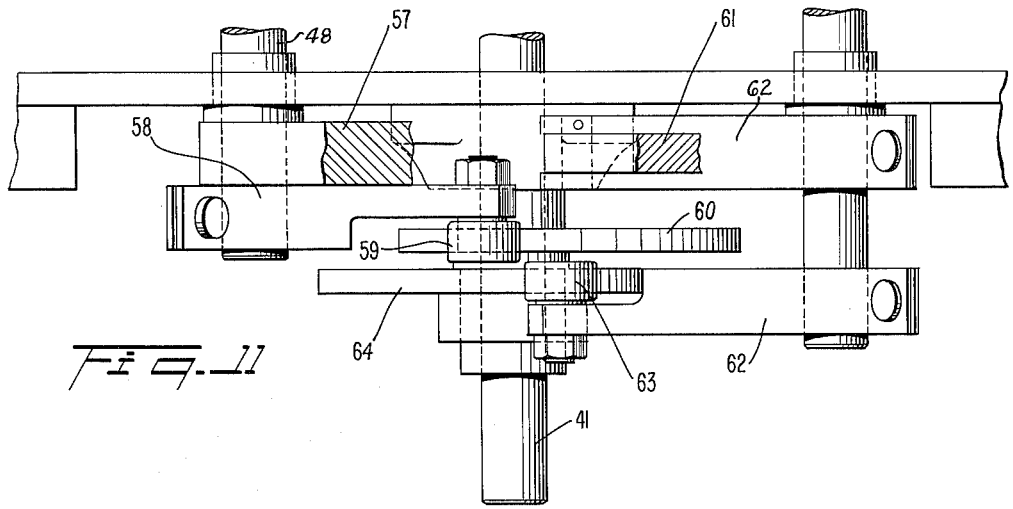
FIG. 11 is an enlarged top plan view of the means for operating the nut transferring apparatus taken along line 11—11 of FIG. 3.
Figure 12:
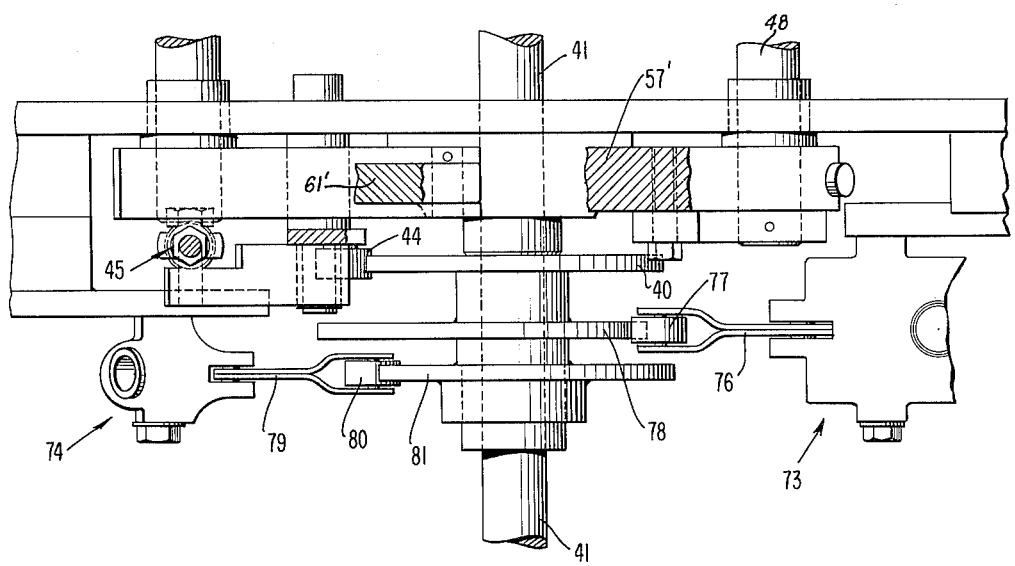
FIG. 12 is an enlarged top plan view of the means for controlling the vacuum to the nut transferring means, and the means for controlling the opening and closing of the buckets, taken along line 12—12 of FIG. 4.

The nut transfer means, FIGS. 3, 4 and 9, comprises a vacuum pick-up device 52 having a manifold 53 and a frame 54. A pipe 55 secured to one end of manifold 53 supplies a vacuum and/or compressed air to the manifold. A plurality of pairs of downwardly extending pipes 56 are spaced along the bottom surface of the manifold. Pipes 56 are so spaced transversely of frame 54 that each pipe is in alignment with a compartment in the buckets when the vacuum device is moved to a position over said buckets. At the end of each pipe 56 is secured nut engaging means comprising a resilient tube member 49 having a small orifice at the outer end for contact with a nut in tray 26. The pick-up device 52 is moved through an arcuate path, as shown in FIG. 4, from a position above the buckets at one end of its stroke to a position wherein the ends of tubes 49 are extended into the nut supply in tray 26. The movement of the vacuum device is controlled by the following mechanism shown in FIGS. 2, 3 and 11. A lever 57 has one end pivotally secured to an arm 52' which is one of a pair of parallel arms 52' and 52" projecting respectively from opposite sides of frame 54, and the other end secured to a shaft 48 which is rotatably mounted in supports extending between each pair of upright members 20, 21. A lever 58 having a roller 59 mounted thereon is secured to one end of shaft 48. Roller 59 is positioned in alignment with cam 60 which is secured to shaft 41. Upon rotation of cam 60 the frame 54 is caused to move generally horizontally toward and away from the tray 26. A lever 57' has one end pivotally secured to the arm 52" at the side of frame 54 opposite from lever 57 and its other end secured to shaft 48. An arm 61 has one end pivotally secured to arm 52' of frame 54 and the other end pivotally mounted to one end of a lever 62. Lever 62 is pivotally mounted on a shaft supported in the same manner as shaft 48 and has a roller 63 mounted at its other end. Roller 63 contacts a cam 64 which is securely mounted on shaft 41. A spring 65 is mounted to lever 58 and to the frame of the apparatus and serves the function of holding rollers 59 and 63 in constant contact with their respective cams. An arm 61' has one end pivotally secured to arm 52" at the side of frame 54 opposite from arm 61 and the other end pivotally mounted in one end of lever 62'. Lever 62' has its other end pivotally mounted on the other end of the shaft to which lever 62 is secured. Cam 64 through arms 61 and 61' provides the movement of the suction device toward and away from the tray 26. Cams 60, 64 are so shaped that upon rotation of shaft 41 the suction device is moved from a starting position where the tubes 49 are directly over the buckets and follows a path of movement carrying it generally horizontally and as it approaches the tray 26 moves downwardly toward the same to a position where the ends of tubes 49 are in contact with the nut supply. The suction device has a slight dwell at the position where the ends of the tubes are contacting the nut supply. Continued rotation of the cams causes the suction device to rise above the nut supply. While the manifold is still over the tray it is subjected to a sharp shaking movement due to the predetermined shape of the surface of cam 64. The suction device then continues in a generally horizontal path of movement until it is returned to its starting position directly over the buckets. As the tubes 49 are lowered into the nut supply, vacuum is connected to the manifold and remains connected until the vacuum device has been returned to a position directly over the buckets. The finite dwell time of the tubes 49 in the nut supply, plus the fact that the nuts in the tray are constantly being agitated by vibration, provides a high probability that a nut will be attracted and held by the orifice of each tube. In some cases two nuts may be attached to the orifice of a single tube 49, however, the means for releasing any plural pick-ups comprising the shape of cam 64 causing the sharp shaking movement imparted to the vacuum device is effective in dislodging one of the nuts of a double feed without disturbing the retention of the other tubes 49 to which a single nut has been attracted.

Air or vacuum is supplied to the manifold 53 through pipe 55 which has one end secured to a T-fitting 70 which in turn is connected to pipe line 71 and 72. Line 72 is connected to a source of vacuum (not shown) with a valve 73 interposed between said source and the T-fitting 70. Line 71 is connected to a source of compressed air (not shown) with a valve 74 interposed between said source and the T-fitting 70. Valve 73 is of a commercially available type having a spring loaded plunger 75 which is urged to the left, and the closed position as viewed in FIG. 4. A lever 76 having a roller 77 on one end is pivotally mounted to the valve housing. Roller 77 contacts a cam 78 which is fixed to shaft 41. The forward end of plunger 75 contacts lever 76. A spring member is telescopically mounted over the forward end of plunger 75 and is compressed between the valve housing and the lever 76 whereby the roller 77 is constantly retained in contact with the cam 78. Valve 74 is of the same general construction and operation as valve 73. A lever 79 is pivotally mounted to the valve housing and carries a roller 80 at one end which engages a cam 81 on shaft 41. Cam 78 is so shaped that valve 73 is opened to the vacuum source as the manifold of the vacuum device approaches the tray 26 and remains open until the manifold has been moved back to a position where the tubes 49 are positioned directly above the buckets.

At this point the valve 73 closes and the vacuum source is interrupted thus allowing the nuts being held by the tubes 49 to drop into buckets. The valve 74 remains closed throughout this cycle of operation of the valve 73. The manifold of the vacuum device starts a new cycle of operation as soon as the nuts have been dropped into the buckets. While the manifold is moving toward tray 26, and while the vacuum valve 73 is still closed, the compressed air valve 74 opens for a very short interval whereby the tubes 49 are cleared. As has been described above the buckets have a rapid opening bottom mechanism so that while the vacuum pick-up device is picking up another group of nuts the bottom portions of the buckets are opened to permit the previously deposited and oriented nuts to fall downwardly a short distance onto the candy bar centers 23. After the nuts have been deposited on the centers 23 the entire assemblies may be carried through an enrobing apparatus which covers the entire assembly with chocolate.

As shown in FIGS. 5, 6 and 7, there is provided an escapement apparatus 12 for assuring that the candy bar centers 23 are fed in proper time to the operation of the nut laying apparatus. In the disclosed embodiment the escapement apparatus comprises a feed belt 85 and two sets of conveyor belts 86, 87. The feed belt 85 is carried around an idler roll 90 and a roll 91 which is driven by a suitable chain and sprocket drive connection to main drive shaft 43. Conveyor belts 87 and belt 22 constitute a first conveyor. Belts 86 constitute a second conveyor. Each of the sets 86 and 87 comprises a plurality of belts arranged side by side and in end to end alignment with each other. Each of the belts is separated by a fixed divider bar. A shaft 88 extends transversely of belts 86 and has its ends mounted in suitable bearings in the frame 89 of the escapement means. Shaft 88 is driven by a suitable chain and sprocket drive means from the main drive shaft 43. Belts 86 extend over rolls 92, driven rolls on shaft 88 and an idler roll underlying rolls 92; and belts 87 over rolls 94, 95 and an idler roll underlying roll 94. Belts 86 are driven by the rolls on shaft 88 which carries a sprocket 97 driven by a sprocket chain from a counter shaft driven from main shaft 43. A shaft 98 extends transversely of frame 89 at one end of belts 87 and has a sprocket 99 which engages and is driven by the chain 96. A gear train 100 between shaft 98 and the shaft carrying rolls 95 drives said rolls which in turn drive belts 87. A shaft 101 extends transversely of frame 89 and over the other end of belts 87. A sprocket 102 is secured to shaft 101 and engages the chain 96 for rotation of said shaft. Feed means comprising a plurality of drop rollers 103 are rotatably mounted over each of the belts 87 and in vertical alignment with end roll 94. Each roller 103 is mounted to a shaft 104 which has one end rotatably mounted in a horizontally extending arm 105. The other end of arm 105 is secured to a collar 106 which is loosely mounted over shaft 101. Roller shaft 104 is driven from shaft 101 by a sprocket and chain drive 107. Thus each roller 103 is driven through the rotation of shaft 101. An auxiliary arm 108 is mounted at its mid-section to a collar 109 which is loosely mounted over shaft 101. One end of arm 108 is secured to arm 105 and the other end 110 extends to the rear of shaft 101 as shown in FIG. 7. The weight of roller 103 will rotate arm 105 and the roller toward belt 87. A stop bar 111 is secured at each end to the frame and extends over the top surface of end 110 of auxiliary arm 108 to limit the movement of roller 103 toward belt 87. Through this means roller 103 is retained a predetermined distance above belt 87 which is smaller than the smallest thickness of a candy bar center that will pass between roller 103 and belt 87. Since there is no restriction on the upward movement of roller 103 a variety of thicknesses of candy bar centers will pass between it and belt 87 while maintaining sufficient pressure to assure accurate feeding onto belts 87. Since each of the rollers 103 is independently mounted to shaft 101 they will adjust for the thickness of each candy bar center independently of the other rollers while at the same time all of the rollers will be rotated at the same speed. The speed of belts 87 is greater than belts 86 in order to create a desired gap between respective centers in each line.

Candy bar centers are fed to the feed belt 85 manually or by any known mechanical means. The dividers between each belt 86 will assure that the candy bar centers are aligned along the axis of movement of the belts and also retain the centers on the belts. In order to prevent the centers from riding up onto each other there is provided a brush means 115 which is mounted to the frame. This brush may be stationary or have a slight oscillating movement. The brush means 115 may be a conventional brush or a resilient finger means, the contacting surface of which is spaced above the top surface of each conveying means a distance slightly greater than the maximum thickness of the candy bar centers. By this means any center which has ridden up onto another is pushed off. At the end of belts 86 there is provided a timing or stop means to control the feeding of the candy bar centers onto belts 87 and beneath the drop rollers 103. This timing means comprises a shaft 116 freely rotatably mounted in the frame 89. Secured to shaft 116 are a plurality of arm members 117 with one arm positioned over each of the belts 86. Since each of the arms 117 is of identical construction and operation a description of one will be sufficient for an understanding of all. Each arm 117 has one end loosely mounted over shaft 116 and a roller 118 mounted at its other end. Arm 117 has a slight downward arcuate shape so that roller 118 will normally ride on the top surface of belt 86 and in vertical alignment with roll 88. A weight 119 is normally mounted to the top surface of arm 117 to assure that roller 118 is retained against belt 86 with a slight pressure to provide a blockage of candy bar centers on this belt. Upon raising of roller 118 a candy bar center is released and fed into the bite of belt 87 and roller 103. Roller 118 rides on the top surface of each candy bar center and immediately drops into contact with belt 86 at the end of each center thus effectively blocking the passage of the next center until the roller is raised. A collar 120 is fixed to shaft 116 on each side of arm 117. To one of the collars is secured a lifting finger 121 which extends outwardly and then at right angles thereto to a position under arm 117. Upon rotation of shaft 116 in a counterclockwise direction, as viewed in FIGS. 6 and 7, the finger lifts arm 117 and its roller 118 thus permitting a candy bar center to be released. The lifting is only momentary so that the roller 118 is immediately released to ride on the top surface of the released center as described above. The momentary lifting of roller 118 through the slight counterclockwise rotation of shaft 116 is accomplished by the following mechanism. An arm 122 is secured to the outer end of shaft 88. A pin 123 extends outwardly from the end of arm 122. A lever 124 is secured at one end to shaft 116 and has its other end positioned in the arcuate path of movement of pin 123 so that the rotation of the pin will lift the end of the lever a short distance.

In order to assure that the nuts adhere to the candy bar centers it has been found convenient to coat the top of each center with a narrow stripe of chocolate. This stripe is applied by any of the conventional striping machines which are well known in the candy making art. The striping apparatus is shown positioned so that its conveyor is interposed between belts 87 and conveyor 22 and carrying centers at the same speed.

While the present invention is herein illustrated and described in connection with the feeding and laying of nuts on the top surfaces of candy bar centers, it is equally adapted for the feeding and orienting of any regular or irregular shaped objects and depositing the same onto another object.

Various changes may be made in the design and arrangement of the parts of the illustrated embodiment without departing from the spirit and scope of the invention as will now be clear to those skilled in the art. It is therefore to be expressly understood that the present invention is not limited to the particular embodiment thereof which is herein illustrated and described.

What is claimed is:

1. In a candy making apparatus, a nut applying means, a first conveyor to continuously move a series of candy centers past said nut applying means, means to selectively feed nuts to said nut applying means, means operable in timed relation to the movement of each center past said nut applying means to deposit said previously fed nuts on said centers, a second conveyor to move a series of candy centers along a path and to feed the same onto said first conveyor, movable stop means on said second conveyor to block the passage of a candy center thereon, means to move said stop means out of blocking position, and means operable in timed relation to the operation of the nut applying means to actuate said means to move said stop means.

2. In a candy making apparatus, a nut applying means, a first conveyor to carry a series of candy centers past said nut applying means, means to feed nuts to said nut applying means, means operable in timed relation to the movement of each center past said nut applying means to deposit said previously fed nuts on said centers, a second conveyor to deposit candy centers on said first conveyor, a roller member operatively contacting said second conveyor and blocking the passage of a candy center on said second conveyor, said roller member being constantly urged toward said second conveyor, means to move said roller member out of blocking position a sufficient distance to permit the passage of single candy centers, and means operable in timed relation to the operation of said nut applying means to actuate said roller member moving means.

3. In an apparatus as defined in claim 2 comprising a feed means for said first conveyor positioned adjacent one end of said second conveyor and comprising a roller positioned over said first conveyor and movable toward and away from said first conveyor, means to move said roller toward said first conveyor, means to drive said roller at the same speed as said first conveyor whereby candy centers fed into the bite between said roller and said first conveyor will be fed onto said first conveyor.

4. In a candy making apparatus the combination of means to continuously convey a plurality of endless rows of candy centers through parallel predetermined paths, a nut applying means adjacent a portion of each of said paths, and having a plurality of compartments arranged to have at least one compartment over each of said paths, a nut supply means, means to transfer a predetermined number of nuts from said supply means and to deposit a predetermined number in each of said compartments, means to release a nut deposited in each compartment, means to align the nuts in said applying means relative to the candy centers moving in said paths, and means operative in timed relation to the movement of said centers to actuate said nut releasing means of each compartment.

5. In a candy making apparatus, the combination of conveyor means to move a plurality of endless rows of candy centers through parallel predetermined paths, a nut applying means adjacent a portion of each of said paths, said nut applying means comprising a plurality of compartments at least one of which is over each said row of candy centers, a nut supply, a frame movable from a first position over said compartments to a second position adjacent said supply, a plurality of nut engaging means secured to said frame and so positioned thereon that one of each of said engaging means will be operatively aligned with one of each of said compartments when said frame is in said first position and all of said engaging means will contact the nuts in said supply when the frame is in said second position, means responsive to the movement of the frame to said second position to render said engaging means operative, means responsive to the movement of the frame to said first position to render said engaging means inoperative, means to release a nut deposited in each compartment, and means operative in timed relation to the movement of said centers to actuate said nut releasing means of each compartment.

6. In an apparatus as set forth in claim 5 wherein each of said nut engaging means comprises a resilient tube member, a source of vacuum connected to each of said tubes, valve means positioned between said vacuum source and each of said tubes, and wherein the means responsive to the movement of the frame to said second position actuates said valve means to open the same, and the means responsive to the movement of the frame to said first position closes said valve means.

7. In an apparatus as set forth in claim 6 comprising means to continuously vibrate the nuts in said supply and means to release from the end of each tube any plural pick-ups after the frame starts its return movement to said first position.

References Cited by the Examiner

UNITED STATES PATENTS

| | | | |
|---|---|---|---|
| 882,167 | 3/1908 | Richardson | 198—34 XR |
| 1,110,404 | 9/1914 | Savy | 107—1.7 |
| 1,385,462 | 7/1921 | Marvin et al. | 107—1.7 |
| 1,579,407 | 4/1926 | Smith | 107—1.7 |
| 1,588,085 | 6/1926 | Atticks | 198—34 |
| 2,546,838 | 3/1951 | Tasche | 214—1 |
| 2,837,042 | 6/1958 | Laval | 107—1.7 |

WALTER A. SCHEEL, *Primary Examiner.*

CHARLES A. WILLMUTH, ROBERT E. PULFREY,
*Examiners.*